United States Patent Office.

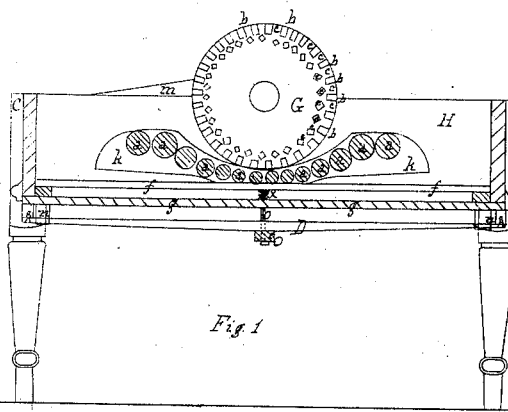
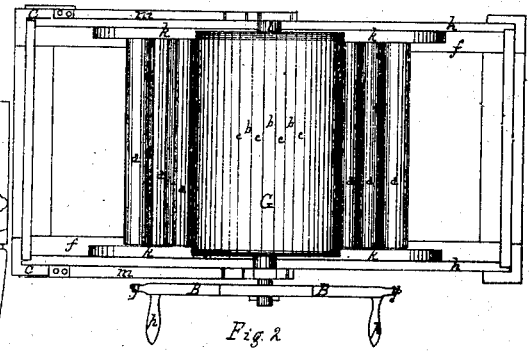
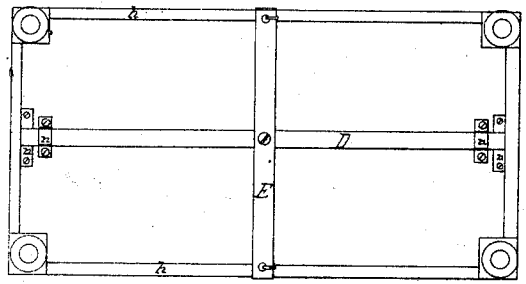
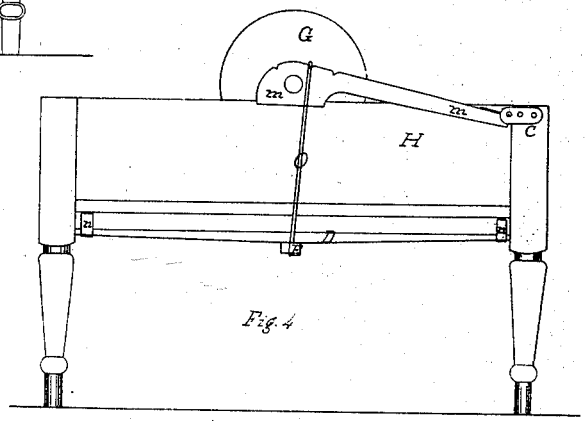
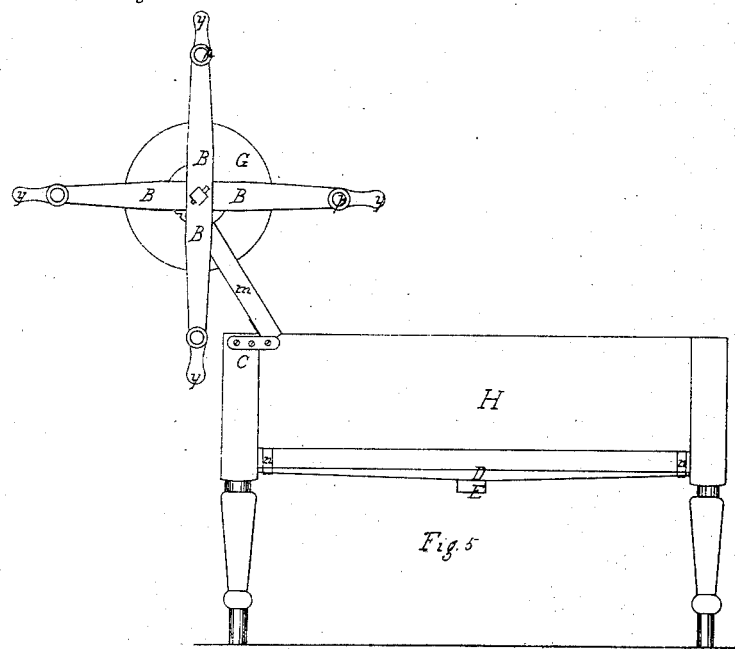

JOB H. HASKELL, OF LOWELL, MASSACHUSETTS, ASSIGNOR TO HIMSELF AND HORACE TAPLIN, OF SAME PLACE.

Letters Patent No. 71,874, dated December 10, 1867; antedated November 23, 1867.

IMPROVED WASHING-MACHINE.

The Schedule referred to in these Letters Patent and making part of the same.

TO ALL WHOM IT MAY CONCERN:

Be it known that I, JOB H. HASKELL, of Lowell, in the county of Middlesex, and State of Massachusetts, have invented certain new and useful Improvements in Washing-Machines, of which the following is a full, clear, and exact description, reference being had to the accompanying drawings, making part of this specification, in which—

Figure 1 is a longitudinal vertical section.

Figure 2 a plan.

Figure 3 a bottom side.

Figure 4 a side elevation.

Figure 5 the opposite side, and shows the cylinder thrown up out of the box.

My invention consists of a series of transverse yielding rollers, $a$, arranged within an elongated box, H, in combination with a suitable rubbing-cylinder, G, which has slats or bars, $b$, extending from one end to the other, with slots or open spaces, $c$, between the bars, and a series of bars, $e$, inside of and between the first-named bars, and opposite the spaces between them. Also in the employment of longitudinal spring-bars or supports, $f$, extending the whole length of the box, a little above the bottom, $g$, and close to the sides $h$, to support the connected roller-stands $k$, and allow the whole series of rollers to yield when any considerable substance passes between the cylinder and the rollers. These spring-bars provide for a rocking motion when no rockers are used, as when any considerable substance enters at one side of the cylinder, and between the cylinder and the rollers, the rollers at that side yield downward, and the rollers on the opposite side of the cylinder rise, and when the substance has passed to beneath the centre of the cylinder, then all the rollers move downward together, and if the article being washed or acted upon by the cylinder and rollers should be quite uneven or irregular in thickness, then the rollers will yield or rock, to accommodate all such inequalities, and at the same time perfectly rub, press, and cleanse the uneven substance between the rubbing-cylinder and the yielding rollers. In conjunction with the series of yielding rollers, and in connection with the cylinder G, and on the ends $l$ of the shaft thereof, I employ connecting and hanging levers, $m$. One end of each of these levers is pivoted or hinged to a post, C, or to some other suitable support, and the other end of each lever contains the bearings for the ends of the cylinder-shaft.

My invention also consists in the use and application of a central longitudinal spring-bar, D, arranged at a short distance beneath the elongated box. This spring-bar extends the whole length of the box, and is securely fastened at its ends to depending supports, $n$. Connected with the under side of the spring-bar D, and at or near the centre of its length, I employ a transverse connecting-bar, E, to the ends of which I connect the levers $m$, by connecting-rods, O, having hooks at each end thereof, to engage with the levers $m$ and the ends of the bar E. The object of this arrangement of the spring-bar D and its connections, is to allow either end of the cylinder to rise, or the whole cylinder, when any considerable substance passes between it and the rollers, thereby dividing the yielding action between the rollers and the cylinder, at the same time keeping a sufficient downward pressure on the cylinder, by means of the spring-bar D, so that the substance or article under operation shall be thoroughly cleansed, whether such article pass under the centre of the cylinder or near either end.

In constructing rubbing-cylinders for washing-machines, I have found that a tight, whole surface, even though it be corrugated, does not allow the water or suds to come in contact, or flow in over the substance of the article being washed in sufficient quantity, and an open-surfaced cylinder, having outer bars only, admits too much water to have the desired effect. Therefore, I employ an inner series of bars or slats, to arrest the action of the water or suds, and I find that a cylinder constructed as herein shown and described, will perform its work better and faster than a cylinder of any other construction. To the working end of the cylinder G apply cross-arms B, with handles, $p$, projecting outward, near the ends $y$ of said arms, by which to turn the cylinder, or give it motion either rotary or vibratory, and more of the latter than the former, so as to rub the article being washed to any desired extent.

When my improved washing-machine is unemployed, the cylinder G may be turned up to a position shown in fig. 5, the rollers and their connections removed, and the box H used for a sink, or for other purposes.

Beneath the centre of each of the spring-bars $f$ I sometimes arrange a spiral or other spring, $x$, to aid the spring-bars, or prevent their being bent or sprung down too far when any large substance passes beneath the cylinder. The middle rollers are, by preference, made smaller, and the other larger, gradually increasing the size of each next preceding roller. Still, they may be all of one size, and answer a good purpose.

Having fully described my invention, what I claim as new, and desire to secure by Letters Patent, is—

The general construction and combination of all the parts, consisting of the cylinder G, series of yielding rollers $a$, roller-stands $k$, spring-bars $f$, levers or arms $m$, spring-bar D, transverse bar E, rod O, and the box, the whole arranged to operate substantially as and for the purpose set forth.

JOB H. HASKELL.

Witnesses:
T. S. WHITNEY,
JOHN E. CRANE.